3,088,953
Δ⁴-ESTRENE-10β,17β-DIOL-3-ONE COMPOUNDS AND PROCESS THEREFOR
Carl Djerassi, Fred Allan Kincl, and Jose Iriarte, all of Mexico City, Mexico, assignors, by mesne assignments, to Syntex Corporation, a corporation of Panama
No Drawing. Filed Mar. 18, 1959, Ser. No. 800,093
Claims priority, application Mexico Mar. 19, 1958
11 Claims. (Cl. 260—397.4)

The present invention relates to novel cyclopentanophenanthrene derivatives and to a method for the preparation thereof.

In particular, it relates to novel Δ⁴-estrene-10β,17β-diol-3-one compounds substituted at C–17α with a residue of an aliphatic hydrocarbon, saturated or unsaturated, having up to 5 carbon atoms, and which may further have an additional double bond between C–1 and C–2, as well as to their C–10, 17-diesters of hydrocarbon carboxylic acids of up to 12 carbons.

The novel compounds, for example the novel 17α-ethinyl-Δ⁴-estrene-10β,17β-diol-3-one and its diesters, are anabolic drugs having a favorable anabolic-androgenic ratio and also show anti-estrogenic effect.

The novel compounds of the present invention are illustrated by the following formula:

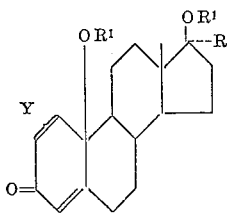

In the above formula Y represents a double bond at C–1(2) or a saturated linkage, R represents lower alkyl, lower alkenyl or lower alkinyl, and R¹ represents hydrogen or a hydrocarbon carboxylic acyl group of up to 12 carbon atoms of straight or branched chain aliphatic, cyclic or mixed cyclic-aliphatic which may be conventionally substituted as for example acetate, propionate, cyclopentylpropionate, benzoate, β-chloropropionate, acetoxypropionate, etc.

The following equation illustrates the process for preparing the above compounds:

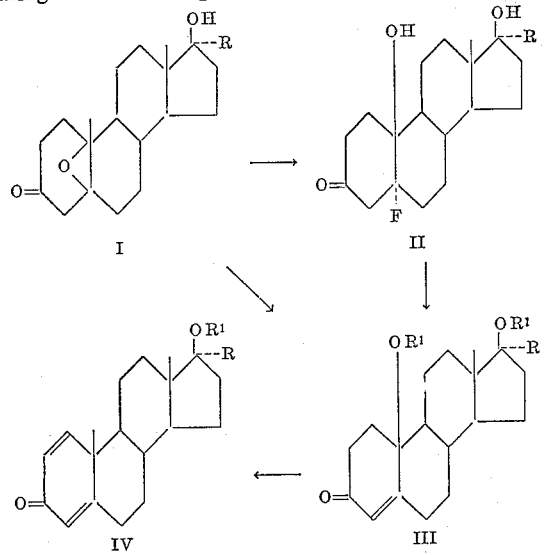

In the above equation R and R¹ represent the same groups as heretofore.

For the preparation of the novel compounds of the present invention we started from 5β,10β-oxido-estran-17β-ol-3-one, substituted at C–17α with a lower alkyl or lower alkinyl group (I) or from a 5α-halo-estrane-10β, 17β-diol-3-one, substituted at C–17α with a lower alkyl, alkenyl or alkinyl group (II) described in our U.S. patent application Serial No. 800,085, filed simultaneously herewith.

We subjected any of such starting compounds to an alkaline treatment, preferably by refluxing with potassium hydroxide in methanol solution, and thus we obtained the Δ⁴-estrene-10β,17β-diol-3-one correspondingly substituted at C–17α (III; R=alkyl, alkenyl or alkinyl, R¹=H).

This reaction has already been described in the literature for the transformation of 5β,10β-oxido-estran-17β-ol-3-one, unsubstituted at C–17α, into Δ⁴-estrene-10β,17β-diol-3-one. Alternatively, we also converted I into III by reaction with perchloric acid in aqueous acetone solution.

In the resulting novel Δ⁴-estrene-10β,17β-diol-3-one substituted at C–17α, there can be introduced an additional double bond between C–1 and C–2 by chemical or microbiological methods, well known for effecting such dehydrogenation. Preferably we esterified the two hydroxyl groups of a 17α-substituted Δ⁴-estrene-10β,17β-diol-3-one by reaction with the anhydride of a hydrocarbon carboxylic acid in the presence of an acid catalyst, such as p-toluenesulfonic acid, and the resulting diester (III; R=alkyl, alkenyl or alkinyl; R¹=acyl) was refluxed with selenium dioxide in mixture with t-butanol and in the presence of pyridine. Thus we obtained the respective 10,17-diester of Δ¹,⁴-estradiene-10β,17β-diol-3-one, correspondingly substituted at C–17α with a hydrocarbon residue (IV; R=alkyl, alkenyl or alkinyl; R¹=acyl). By conventional methods, for example by treatment with methanolic potassium hydroxide, we hydrolyzed these diesters to produce the free 17α-substituted Δ¹,⁴-estradiene-10β,17β-diol-3-one (IV; R=alkyl, alkenyl or alkinyl; R¹=H); for the reesterification of these compounds we employed the method mentioned above for the esterification of the Δ⁴-compounds.

For converting a 17α-alkinyl-Δ⁴-estrene-10β,17β-diol-3-one, obtained by alkaline treatment of the corresponding oxido-compound I, into a 17α-alkenyl-Δ⁴-estrene-10β,17β-diol-3-one, we hydrogenated the triple bond of the former to a double bond. This hydrogenation can be conducted either before or after the esterification of the hydroxyl groups at C–10 and C–17; in the latter case there is obtained the diester of the corresponding alkenyl-compound of Formula III.

For the esterification of the hydroxyl groups of III and IV we used the anhydride of a carboxylic acid having up to 12 carbon atoms, of straight or branched chain, cyclic or mixed cyclicaliphatic, substituted or not with methoxy, halogen or other groups to produce diesters such as the acetates, propionates, butyrates, hemisuccinates, enanthates, caproates, benzoates, trimethylacetates, cyclopentylpropionates, phenylpropionates, acetoxypropionates and β-chloropropionates.

The following specific examples serve to illustrate but are not intended to limit the present invention.

*Example I*

A mixture of 5 g. of 17α-methyl-5β,10β-oxido-estran-17β-ol-3-one and 100 cc. of a 5% solution of potassium hydroxide in methanol was refluxed for 1 hour, poured into ice water and the reaction product was extracted with ethyl acetate. The extract was washed with water to neutral, dried over anhydrous sodium sulfate and the ethyl acetate was evaporated. The residue crystallized from ethyl acetate to furnish 17α-methyl-Δ⁴-estrene-10β,17β-diol-3-one.

3 g. of the above compound was dissolved in 30 cc. of acetic anhydride, treated with 300 mg. of p-toluenesulfonic acid and the mixture was stirred at room temperature for 12 hours. It was then poured into ice water, heated on the steam bath for half an hour and cooled; the precipitate was collected by filtration, washed with water, dried and redissolved in 300 cc. of 1% methanolic potassium hydroxide previously cooled to 5° C. The mixture was kept at this temperature for 1 hour, acidified with acetic acid, concentrated to a small volume under reduced pressure and diluted with water. The precipitate was collected, washed with water, dried and recrystallized from acetone-hexane. There was thus obtained 17α-methyl-Δ⁴-estrene-10β,17β-diol-3-one diacetate.

A mixture of 2 g. of the above compound, 100 cc. of anhydrous t-butanol, 0.8 g. of selenium dioxide and 0.5 cc. of pyridine was refluxed under an atmosphere of nitrogen for 72 hours and then filtered through celite, washing the filter with hot t-butanol. The combined filtrate and washings was evaporated to dryness under reduced pressure and the residue was redissolved in acetone, decolorized with charcoal under reflux, filter and the solution was evaporated to dryness. The residue was purified by chromatography on neutral alumina, thus yielding 17α-methyl-Δ¹,⁴-estradiene-10β,17β-diol-3-one diacetate.

By refluxing with 5% methanolic potassium hydroxide, exactly as described above, there was obtained the free 17α-methyl-Δ¹,⁴-estradiene-10β,17β-diol-3-one.

Example II

In another experiment the intermediate 17α-methyl-Δ⁴-estrene-10β,17β-diol-3-one was obtained by refluxing 17α-methyl-5α-fluoroestrane-10β,17β-diol-3-one with methanolic potassium hydroxide solution, following the method described in the previous example.

Example III

By following the same methods described in the previous examples, all of the 17α-alkyl and 17α-alkinyl-5β,10β-oxido-estran-17β-ol-3-ones and 17α-alkyl, 17α-alkenyl and 17α-alkinyl-5α-fluoro-estrane-10β,17β-diol-3-ones were converted into the respective Δ⁴-estrene-10β,17β-diol-3-ones, correspondingly substituted at C-17α. By the aforementioned acetylation there were obtained the 10,17-diacetates of such compounds, and by subsequent dehydrogenation there were obtained the 10,17-diacetates of the respective 17α-substituted Δ¹,⁴-estradiene-10β,17β-diol-3-ones. By substituting for acetic anhydride, the anhydride of another carboxylic acid having up to 12 carbon atoms, there were obtained the respective diesters, including the dibenzoates and dicyclopentylpropionates.

Thus, from the 17α-ethinyl analogs of 5β,10β-oxido-estran-17β-ol-3-one and of 5α-fluoro-estrane-10β,17β-diol-3-one, there was obtained the 17α-ethinyl-Δ⁴-estrene-10β,17β-diol-3-one, then its dipropionate, and by dehydrogenation of the latter there was obtained 17α-ethinyl-Δ¹,⁴-estradiene-10β,17β-diol-3-one dipropionate, which was saponified to the free diolone. All of the compounds thus obtained were well defined by their constants.

For example, 17α-ethinyl-Δ⁴-estrene-10β,17β-diol-3-one was obtained by crystallization from acetone in the form of prisms having a melting point of 263–265° C.; [α]_D +4.5° (methanol); λ_max. 236 mμ, log E 4.08; γ_max. (KBr) 3380, 3280, 1655 cm.⁻¹.

Example IV

To a prereduced suspension of 20 mg. of 2% palladium on calcium carbonate catalyst in 5 cc. of pyridine there was added 200 mg. of 17α-ethinyl-Δ⁴-estrene-10β,17β-diol-3-one, obtained in accordance with the previous example, and the mixture was hydrogenated until the absorption of hydrogen practically ceased, which occurred when the equivalent of 1 mol of hydrogen had been absorbed. The catalyst was removed by filtration, washing the filter with ethyl acetate, and the combined filtrate and washings was washed dilute hydrochloric acid and water, dried over anhydrous sodium sulfate and evaporated to dryness. The residue was purified by recrystallization from acetone-hexane, thus affording 17α-vinyl-Δ⁴-estrene-10β,17β-diol-3-one.

Example V

A mixture of 300 mg. of 17α-ethinyl-Δ⁴-estrene-10,β,17β-diol-3-one, 3 cc. of acetic anhydride and 30 mg. of p-toluenesulfonic acid was treated under the conditions described in Example I, thus giving rise to the formation of the 10,17-diacetate; the latter was hydrogenated under the conditions described in the previous example. There was thus obtained 17α-vinyl-Δ⁴-estrene-10β,17β-diol-3-one 10,17-diacetate.

Example VI

A solution of 200 mg. of 17α-ethinyl-5β,10β-oxido-estran-17β-ol-3-one in 20 cc. of acetone was treated with 1.5 cc. of 1.5 N perchloric acid and the mixture was kept for 16 hours at room temperature; after pouring into water, the reaction product was extracted with ethyl acetate, washed with water to neutral, dried over anhydrous sodium sulfate and evaporated to dryness. Crystallization of the residue from acetone-hexane furnished 17α-ethinyl-Δ⁴-estrene-10β,17β-diol-3-one, identical with the compound described in Example III.

Example VII

By refluxing 5α-fluoro-estrane-10β,17β-diol-3-one with potassium hydroxide, by the method described in Example I, there was obtained the already known Δ⁴-estrene-10β,17β-diol-3-one, M.P. 208–212° C., [α]_D +80.3° (methanol), λ_max. 236 mμ, log E 4.2.

We claim:
1. A process for the production of a compound of the following formula:

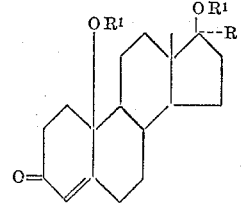

where R is selected from the group consisting of lower alkyl, lower alkenyl and lower alkinyl and R¹ is selected from the group consisting of hydrogen and a hydrocarbon carboxylic acyl group of up to 12 carbon atoms comprising heating a corresponding compound selected from the group consisting of a 5β,10β-oxido compound and a 5α-fluoro-10β-hydroxy compound with a strong alkali in methanol.

2. A compound of the following formula:

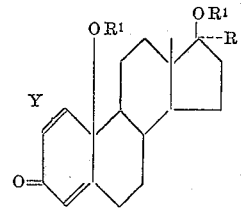

wherein Y is selected from the group consisting of a double bond at C-1(2) and a saturated linkage at C-1(2), R is selected from the group consisting of lower alkyl, lower alkenyl and lower alkinyl and R¹ is selected from the group consisting of hydrogen and a hydrocarbon carboxylic acyl group of up to 12 carbon atoms.

3. 17α-lower alkyl-Δ⁴-estren-10β,17β-diol-3-one.
4. 17α-lower alkenyl-Δ⁴-estren-10β,17β-diol-3-one.

5. 17α-lower alkinyl-Δ⁴-estren-10β,17β-diol-3-one.
6. 17α-lower alkyl-Δ¹,⁴-estradien-10β,17β-diol-3-one.
7. 17α-lower alkenyl-Δ¹,⁴-estradien-10β,17β-diol-3-one.
8. 17α-lower alkinyl-Δ¹,⁴-estradien-10β,17β-diol-3-one.
9. A process for the production of a compound of the following formula:

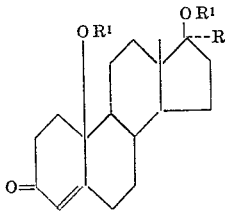

wherein R is selected from the group consisting of lower alkyl, lower alkenyl and lower alkinyl and R¹ is selected from the group consisting of hydrogen and a hydrocarbon carboxylic acyl group of up to 12 carbon atoms comprising treating a corresponding 5β,10β-oxido compound with perchloric acid.

10. A process for the production of a compound of the following formula:

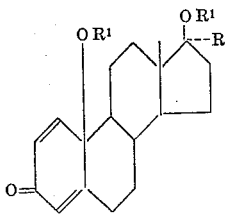

wherein R is selected from the group consisting of lower alkyl, lower alkenyl and lower alkinyl and R¹ is selected from the group consisting of hydrogen and a hydrocarbon carboxylic acyl group of up to 12 carbon atoms comprising heating a corresponding compound selected from the group consisting of a 5β,10β-oxido compound and a 5α-fluoro-10β-hydroxy compound with a strong alkali in methanol and thereafter dehydrogenating at C–1,2.

11. A process for the production of a compound of the following formula:

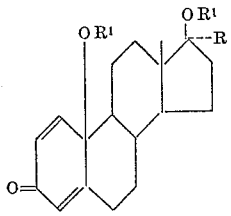

wherein R is selected from the group consisting of lower alkyl, lower alkenyl and lower alkinyl and R¹ is selected from the group consisting of hydrogen and a hydrocarbon carboxylic acyl group of up to 12 carbon atoms comprising treating a corresponding 5β,10β-oxido compound with perchloric acid and thereafter dehydrogenating at C–1,2.

References Cited in the file of this patent
UNITED STATES PATENTS

| | | |
|---|---|---|
| 2,721,871 | Colton | Oct. 25, 1955 |
| 2,729,654 | Colton | Jan. 3, 1956 |
| 2,806,862 | Pederson et al. | Sept. 17, 1957 |
| 2,845,381 | Tindall | July 29, 1958 |
| 2,871,245 | Wettstein et al. | Jan. 27, 1959 |

OTHER REFERENCES

Ringold et al.: J. Org. Chem., vol. 23, pages 239–240 (February 1956).

Ruelas et al.: J. Org. Chem., vol. 23, pages 1744–47 (November 1958).